March 30, 1954
C. B. RICHEY
2,673,508
TRACTOR-IMPLEMENT LINKAGE
Filed April 14, 1952
2 Sheets-Sheet 1
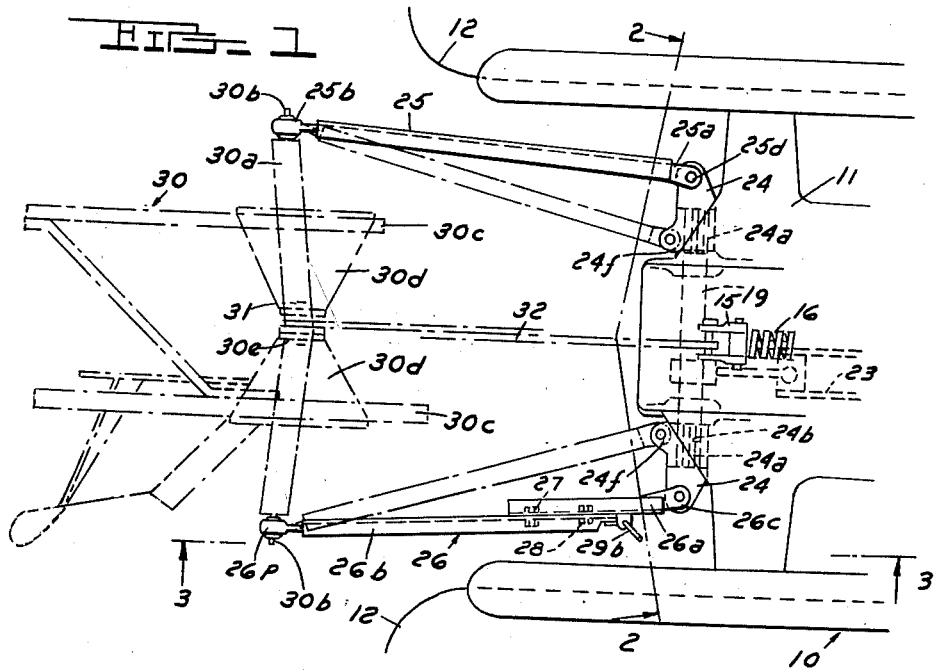
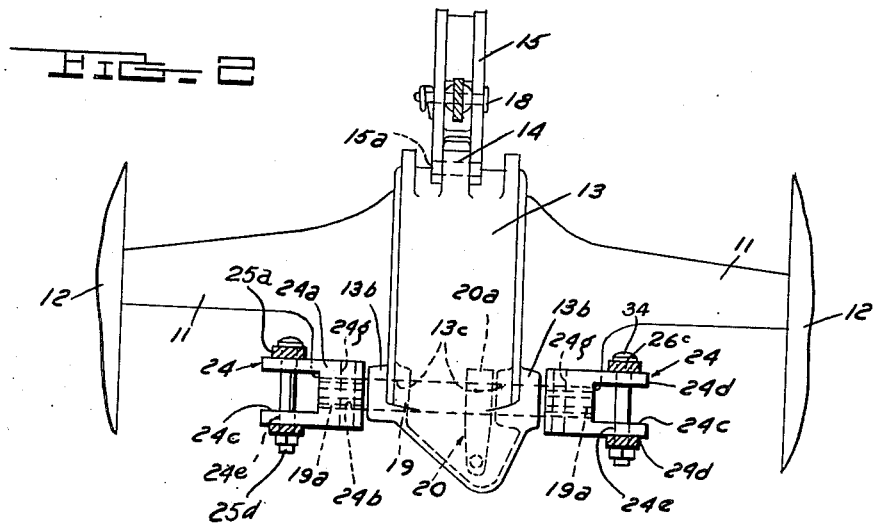
INVENTOR.
CLARENCE B. RICHEY
BY
ATTORNEYS Patented Mar. 30, 1954

2,673,508

UNITED STATES PATENT OFFICE 2,673,508

TRACTOR-IMPLEMENT LINKAGE

Clarence B. Richey, Royal Oak, Mich., assignor, by mesne assignments, to Ford Motor Company, Dearborn, Mich., a corporation of Delaware Application April 14, 1952, Serial No. 282,171

2 Claims. (Cl. 97—46.51)

This invention relates to an implement linkage for tractors and more particularly to an improved power operated linkage for mounted type implements.

It is an established fact that heavy draft implements, such as plows, which produce relatively large side draft forces should be attached to the tractor so that the effective hitch point will be at or near the intersection of the tractor rear axle and the longitudinal tractor axis. This hitching arrangement permits the relatively large rear wheels of the tractor to absorb the side draft forces without adversely affecting the steering properties of the tractor. With implements such as cultivators which should accurately follow the steering movements of the tractor front wheels, it is desirable that the effective hitch point of the implement be located at the forward end of the tractor.

While implement hitches have been heretofore developed comprising a pair of laterally spaced forwardly converging hitch links which are vertically raised by a suitable power operated means, such hitches are not of the simplest construction nor do they conveniently provide the desirable selective convergence of the hitch links to shift the effective hitch point on the tractor to suit the implement mounted on the linkage.

Accordingly, an object of this invention is to provide an improved implement hitch linkage directly mountable upon a power operated tractor rock shaft which can be selectively positioned on the rock shaft to obtain variable convergence of the hitch link elements of the linkage.

A further object of this invention is to provide an improved implement hitch linkage for a tractor including laterally spaced, forwardly converging hitch links which permits convenient variation of the degree of convergence of such hitch links and also provides adjustability of the linkage for leveling of an implement mounted on such linkage.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of the rear end of a tractor incorporating the improved implement linkage constructed in accordance with this invention and showing an implement mounted on the trailing ends of the linkage;

Figure 2 is a cross sectional view taken along the plane 2—2 of Figure 1;

As shown on the drawings:

Briefly, this invention contemplates the selective mounting of a pair of trailing hitch links at any selected one of a plurality of laterally spaced positions on a power operated rock shaft journaled on the rear end portion of a tractor. The trailing ends of the hitch links are connected at laterally spaced points on an implement and when so connected the hitch links converge forwardly. By selective lateral mounting of the forward ends of the hitch links on the rock shaft the forward convergence of the hitch links can be readily changed to selectively have the convergence of such links at a point adjacent the intersection of the tractor rear axle and the tractor axis or at the front end of the tractor.

Figure 3:
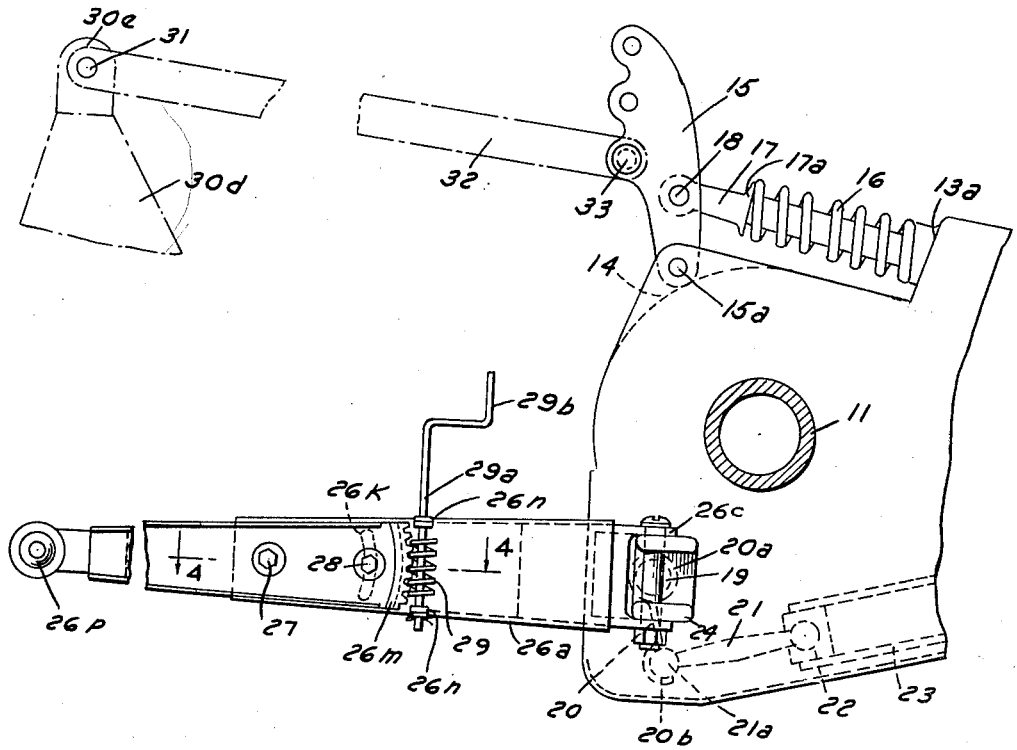
Figure 3 is an enlarged scale sectional view taken along the plane 3—3 of Figure 1.
Figure 4:
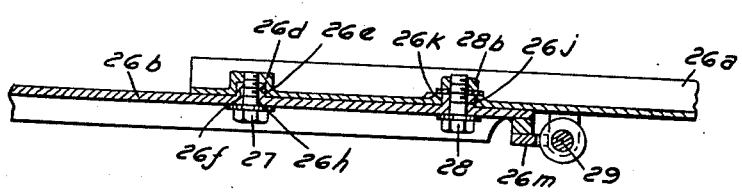
Figure 4 is an enlarged scale detail sectional view taken along the plane 4—4 of Figure 3.

The improved hitch linkage of this invention will now be described in greater detail. In Figure 1 there is shown the rear end portion of a tractor 10. Tractor 10 has a rear axle housing 11 which journals an axle (not shown) having a pair of tractor rear wheels 12 on its ends. The rear axle housing 11 has a central differential housing portion 13 and on the upper rear portion thereof there is provided an upstanding lug 14. A rocker member 15 has its lower end portion pivotally secured by a transverse pin 15a to the upstanding lug 14. A control spring 16 surrounds yoke member 17 and one end of spring 16 abuts an integral shoulder 17a provided on the yoke member 17. The other end of spring 16 abuts an integral shoulder 13a provided on top of the housing 13 as best shown in Figure 3. The yoke member 17 has its rear end pivotally connected to the rocker member 15 as shown at 18 and its front end extends within differential housing 13 to connect to the control valve of the tractor hydraulic mechanism in a well-known fashion.

Adjacent the rear edge of the central housing portion 13 of tractor 10, there are provided a pair of integral bosses 13b on opposite sides thereof and in opposed aligned relationship with one another as best shown in Figures 1 and 2. The bosses 13b also project inwardly within the hollow interior of the housing 13 as shown in dotted outline in Figure 2. The bosses 13b are respectively provided with apertures 13c which are transversely aligned and a rock shaft 19 is journaled in such aligned apertures. Adjacent the right hand boss 13b, as shown in Figure 2, there is non-rotatably secured to rock shaft 19 a lever arm 20. The arm 20 has a circular portion 20a which surrounds the shaft 19 and is suitably secured to the shaft 19. The lower end of the arm 20 terminates in a semispherical socket portion 20b which receives the ball shaped end 21a of a piston rod 21. The other end of piston rod 21 is suitably connected to a piston 22 slidably mounted in the bore of an hydraulic cylinder 23 contained within the lower portion of the housing 13.

Piston 22 is actuated by pressured hydraulic fluid introduced into the bore of the cylinder 23 by a built-in tractor powered hydraulic system (not shown). Thus as the piston 22 is forced rearwardly within the cylinder 23 the shaft 19 will be partially rotated through the force exerted against the arm 20 by the piston rod 21. As previously mentioned, the yoke 17 actuates a control mechanism (not shown) which operates to control the supply of fluid to the cylinder 23 in accordance with variations in draft of the implement, in the same manner as in the present well-known Ford tractor. Inasmuch as substantially the same hydraulic system is utilized to rotate the rock shaft 19, as in the present well-known Ford tractor, further description thereof is not believed necessary.

The ends of rock shaft 19 respectively project outwardly somewhat beyond the bosses 13b and such ends are splined as shown at 19a. A pair of hitch link connector members 24 are mounted on the outwardly projecting splined ends of rock shaft 19. The connector members 24 have a body portion 24a and each of the body portions 24a has a splined hole 24b therein. The splined holes 24b in the connectors 24 cooperate with the splines 19a on the ends of rock shaft 19 when such connectors are mounted on the shaft ends to non-rotatably secure the connectors to the rock shaft 19. The outwardly projecting ends of the connectors 24 are bifurcated as shown at 24c thereby defining a pair of lugs 24d. The lugs 24d of the connectors 24 have aligned transverse apertures 24e. Adjacent the innermost ends of the connectors 24, a second pair of rearwardly projecting lugs 24f are provided on the connector members 24 which are vertically apertured as shown at 24g for a purpose to be presently described.

A pair of rearwardly extending hitch links 25 and 26 are provided which have their forward ends pivotally connected to the connector members 24. Hitch link 25 is a channel shaped member which has a forked end 25a. The forked end 25a is vertically apertured and a bolt 25d is inserted through such apertures and through the aligned apertures 24e in the bifurcated end of the connector member 24, or alternatively through the hole 24g in lug 24f. The bolt 25d permits pivotal connection of such link to the connector 24 at either of two laterally spaced points. The hitch link 25 tapers rearwardly and terminates in a conventional spherical ball-type apertured connector 25b.

The hitch link 26 is a two piece member comprising a forward portion 26a and a rear portion 26b. The forward portion 26a has a forked end 26c which permits pivotal mounting of such portion to either the lug 24d or lug 24f of the right hand connector 24 as by bolt 34, as best shown in Figure 2. Both of the front and rear portions 26a and 26b of the hitch link 26 are of channel shape and such portions are pivotally connected for vertical movement of the rear portion 26a. An integral boss 26d is provided on the inside of the forward portion 26a of link 26, near its rear end, and such boss has a cylindrical recess 26e. The rear portion 26b has a cylindrical boss 26f on its back surface, disposed rearwardly from its forward end, which snugly fits within the cylindrical recess 26e. A bolt 27 inserted through a transverse aperture 26h, in the rear link portion 26b concentric with the boss 26f, pivotally secures the two link portions 26a and 26b together. Adjacent the forward end of the rear link portion 26b there is provided on the back surface thereof an arcuately shaped lug 26j. The arcuate lug 26j snugly fits within an arcuate slot 26k provided in the forward end portion 26a. The slot 26k is, of course, longer than the arcuate lug 26j to permit movement of such lug therein. A bolt 28 and a nut 28b slidably secures the lug 26j within slot 26k.

The extreme forward end of the rear end portion 26b of hitch link 26 has an arcuately shaped rack portion 26m formed of plate stock and secured as by welding to such forward end. The rack 26m cooperates with a vertical worm 29. The worm 29 is formed on the lower end of a vertical shaft 29a which is vertically journaled in a pair of integral vertically aligned and spaced bracket lugs 26n provided on the upper and lower edges of the forward portion 26a of hitch link 26. The vertical shaft 29a terminates upwardly in a crank portion 29b. Thus the tractor operator can conveniently reach rearwardly from the seat and grasp the crank portion 29b to rotate the worm 29 which cooperates with the rack portion 26m to effect pivotal movement of the rear link portion 26b to vertically move its extreme rear end portion. Like the link 25, the extreme rear end portion of link portion 26b terminates in a universally swiveling ball-type apertured connector 26p.

The trailing ends of the hitch links 25 and 26 are conveniently utilized to attach an implement thereto. In Figure 1 there is shown, somewhat schematically, a two base moldboard plow 30 which has a cross shaft 30a provided with a pair of horizontal mounting pins 30b on its ends which receive the apertured spherical connectors 25b and 26p provided on the ends of the links 25 and 26. The cross shaft 30a of the plow 30 is disposed transversely of a pair of longitudinally disposed transversely spaced plow beams 30c. A pair of upstanding inwardly sloped side plates 30d define what may be called an A-frame and such side plates are suitably apertured to receive the cross shaft 30a. The side plates 30d terminate upwardly in spaced apart vertical top portions 30e between which is pivotally mounted, as by a bolt 31, the trailing end of a tractor top link 32. The forward end of the top link 32 is connected to the rocker member 15 by a bolt 33. Obviously, other types of implements can be connected to the hitch links 25 and 26 and the plow 30 is here shown only for purposes of illustrating the function of the links 25 and 26.

*Operation*

The hitch links 25 and 26 are conveniently vertically moved by manual manipulation of the conventional control lever, such as is provided on the well-known Ford tractor (not shown), which introduces pressured fluid to the hydraulic cylinder 23. Outward movement of the piston 22 rocks the rock shaft 19 through the force imparted by the piston rod 21 to the arm 20, thereby forcing the hitch links 25 and 26 to move vertically upwardly. The hitch links 25 and 26 lower by the action of gravity when the control lever (not shown) is set to permit such links to lower. When the forward ends 25a and 26a of the hitch links 25 and 26 are mounted on the outer lugs 24d of the connectors 24, the convergence of links 25 and 26 is then directed to a point near the forward end of the tractor. This mounting of the hitch links is preferable for implements such as cultivators.

For plows and similar side draft producing implements it is desirable that the links converge forwardly to a point in the vicinity of the rear axle 11 of tractor 10; hence the forward ends of the links 25 and 26 are connected to the lugs 24f of the connector members 24. The soil reaction on the implement is transmitted to the top link 32, placing such link in compression, and such force is transmitted through the rocker member to the yoke 17 which functions to operate the conventional hydraulic control mechanism contained within the tractor rear end housing to automatically raise and lower the hitch links 25 and 26 in response to draft variations, in the same manner as in the well-known Ford tractor. The rear end portion 26b of the hitch link 26 is conveniently vertically adjusted by the crank 29b which effects rotation of the worm 29 to vertically pivot the rear portion 26b of hitch link 26 about its pivot point 27. Thus a plow or other implement mounted on the hitch links 25 and 26 may be conveniently leveled in a transverse vertical plane to its optimum operating position.

From the foregoing description, it is thus clearly apparent that there is here provided an improved implement hitch linkage for tractors. The hitch links are directly mounted on the power-operated rock shaft of the tractor which thereby eliminates various connecting rods and rock arms usually associated with the power lifting mechanism of the tractor, hence simplifying and reducing the cost of the construction. A further advantage of this improved linkage resides in the selective lateral position mounting of the forward ends of the hitch links on the rock shaft to provide a selective convergence of the hitch links most suitable for the particular implement mounted on the hitch linkage.

It will, of course, be understood that many details of construction may be varied through a wide range without departing from the principles of this invention and it is, therefore, not the purpose to limit the patent granted hereon otherwise than necessitated by the scope of the appended claims.

I claim:

1. An implement hitch linkage for tractors having a rear axle housing comprising in combination, a lateral rock shaft journaled in the rear axle housing and having its ends respectively projecting therebeyond, a pair of connector members respectively non-rotatably secured to said projecting shaft ends, each of said connector members having a pair of laterally spaced transverse mounting holes, a pair of longitudinally disposed hitch links having their rear ends adapted for connection at laterally spaced points on an implement, pivot means insertable in a selected pair of said mounting holes for respectively pivotally mounting the forward ends of said hitch links on said connector members for lateral swinging movement, said hitch links converging forwardly in either position of mounting but at different longitudinally spaced points on the tractor, and power-operated means for rocking said shaft for vertical lifting of said hitch links.

2. The combination defined in claim 1 wherein one of said hitch links comprises interconnected forward and rear elements and means for vertically adjusting the rear elements of said one hitch link relative to the forward element for leveling the implement.

CLARENCE B. RICHEY.

References Cited in the file of this patent
UNITED STATES PATENTS

| Number | Name | Date |
|---|---|---|
| 1,687,719 | Ferguson | Oct. 16, 1928 |
| 1,916,945 | Ferguson | July 4, 1933 |
| 2,324,840 | Hipple | July 20, 1943 |
| 2,394,210 | Sherman | Feb. 5, 1946 |
| 2,445,145 | Love | July 13, 1948 |